INVENTOR
DAG O. A. JOHANNISSON

3,346,011
VALVE ARRANGEMENT FOR BREATHING APPARATUS
Dag Olof Alfred Johannisson, Lidingo, Sweden, assignor to AGA Aktiebolag, a corporation of Sweden
Filed May 11, 1964, Ser. No. 366,247
Claims priority, application Sweden, June 7, 1963, 6,335/63
3 Claims. (Cl. 137—604)

The invention relates to a valve arrangement for breathing apparatus which comprises a tubular member for supplying breathing gas to a patient and having a branch tube connected to it so as to terminate in an aperture in the wall of the tubular member.

It is an object of the invention to provide in an arrangement of this type a simple and reliable nonreturn valve controlling the inflow of gas through the branch tube into the tubular member, and this is achieved according to the present invention by means of a valve member in the form of a flexible disc seated in its inoperative position on the inside of the tubular member and covering the aperture of the branch tube.

This arrangement according to the invention is a substantial simplification over an arrangement of conventional type having a nonreturn valve inserted in the branch tube. In the latter type of arrangement, a particular valve seat is required in the branch tube for the valve, which results in a complicated structure which is not easy to manufacture. The solution of the present invention renders unnecessary the provision of a particular valve seat, since this function is filled by the interior wall of the tubular member itself.

Figure 1:
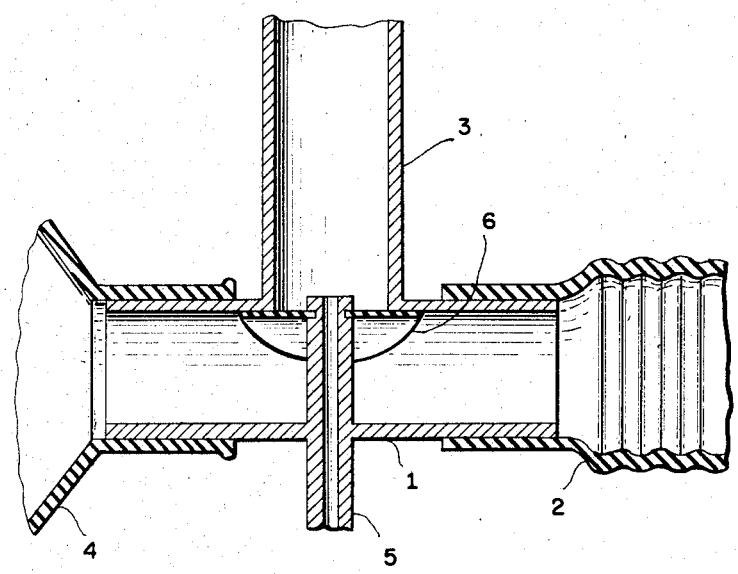
Figure 2:
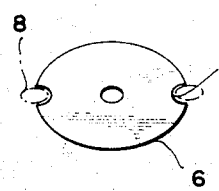

The valve according to the invention is furthermore combined with a dosage arrangement for a narcotic, as will be apparent in more detail from the following description of an embodiment of the invention, shown in FIG. 1 of the attached drawing. FIG. 2 is a detail view of the valve disc, and includes a schematic illustration of suitable locking members.

The FIG. 1 arrangement comprises a tubular member 1 which is connected at one end to a conduit 2, which is connected to a face mask for narcosis or inhalation or the like, by means of which breathing gas is supplied to a patient. The tubular member 1 has a branch tube 3 and the other end thereof is connected to a rubber bag 4 or the like, which can be compressed if it is desired to supply air to the patient by outward pressure. In the tubular member there is provided a dosage tube 5 for a narcotic extending concentrically with the branch tube 3 across the interior of the tubular member 1 into the aperture of the branch tube 3 in the wall of the tubular member. A notch in the dosage tube is provided for supporting an elastic valve disc 6. In the inoperative position, it has a shape corresponding substantially to the curvature of the tubular member 1. To prevent turning or incorrect mounting of the valve disc 6, it may be provided in a manner shown in FIG. 2 with one or more marginal notches 7 in which some arbitrary type of locking member, such as indicated schematically at 8, may engage. The locking member may be provided on the inside of the wall of the tubular member 1 so as to retain the valve disc 6. The locking member may be of any known type and is not shown in FIG. 1.

The tubular member 1 shown with the branch tube 3 is a simple device easy to manufacture and substantially less complicated to produce than an arrangement in which a plane valve seat is formed at the aperture of the branch tube 3. The dosage tube 5 allows narcotic to diffuse into the branch tube 3, which may be given a suitable length to supply the correct amount of narcotic to a patient breathing in through the conduit 2. An advantage of the arrangement in this connection is that the supply of narcotic may take place without the creation of an overpressure, which is otherwise present in many earlier arrangements and would tend to block the free exhalation of the patient by producing an outward pressure on the valve member which is to be unseated by the pressure of the patient's breathing. If the patient's own breathing should stop, artificial respiration may be performed by means of a pressure on the rubber bag 4.

What is claimed is:
1. A valve arrangement for breathing apparatus comprising: a tubular member adapted for supplying breathing gas, said tubular member having a cylindrical interior wall portion and having a branch tube transversely connected thereto terminating in an aperture on said cylindrical wall portion, a valve member in the form of a flexible disc seated in its inoperative position on said cylindrical wall portion and following the contour thereof so as to close said aperture, and a dosage tube extending transversely through said tubular member and communicating with said branch tube for supplying a narcotic, said dosage tube having said disc supported adjacent the end of the dosage tube and at the midpoint of the disc.

2. A valve arrangement for a breathing apparatus comprising a tubular member having a cylindrical interior surface for supplying breathing gas, a branch tube transversely connected to said tubular member, said cylindrical interior surface of said tubular member having an aperture defined thereon by the intersection of the interior surface of said branch tube; a hollow dosage tube mounted through said tubular member and extending within said branch tube for feeding a fluid into said branch tube from outside the apparatus; a flexible disc having a central hole; means on said dosage tube for mounting said disc on said dosage tube substantially flush with the cylindrical interior surface of said tubular member so as to hold said disc in a semicylindrical flexed position so that the surface portion of said disc adjacent its periphery is yieldably held against the said interior surface of said tubular member adjacent the periphery of said aperture.

3. A valve arrangement as claimed in claim 2, in which said means for mounting said disc on said dosage tube consists of a notch in the wall of the dosage tube, and said disc is provided with one or more marginal notches cooperating with a locking member on the interior surface of the tubular member to prevent turning of said disc about the longitudinal axis of said dosage tube.

References Cited
UNITED STATES PATENTS
| | | | |
|---|---|---|---|
| 724,913 | 4/1903 | Montgomery | 137—525 X |
| 3,128,994 | 3/1964 | Hungate | 137—604 X |

OTHER REFERENCES
Current Comment, Anesthesiology, vol. 20, No. 3, pp. 383–385, May–June, 1959.

WILLIAM F. O'DEA, Primary Examiner.
H. WEAKLEY, Assistant Examiner.